(12) United States Patent
Sharma

(10) Patent No.: US 12,148,437 B2
(45) Date of Patent: Nov. 19, 2024

(54) FEATURE DOMAIN BANDWIDTH EXTENSION AND SPECTRAL REBALANCE FOR ASR DATA AUGMENTATION

(71) Applicant: Microsoft Technology Licensing, LLC, Redmond, WA (US)

(72) Inventor: Dushyant Sharma, Mountain House, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 17/547,322

(22) Filed: Dec. 10, 2021

(65) Prior Publication Data

US 2023/0186925 A1    Jun. 15, 2023

(51) Int. Cl.
*G10L 19/02*    (2013.01)
*G10L 15/06*    (2013.01)

(52) U.S. Cl.
CPC ............ *G10L 19/02* (2013.01); *G10L 15/063* (2013.01)

(58) Field of Classification Search
CPC ....... G10L 19/02; G10L 15/063; G10L 13/00; G10L 21/0388
USPC ........................................................ 704/500
See application file for complete search history.

(56) References Cited

U.S. PATENT DOCUMENTS

2008/0215322 A1   9/2008   Fischer et al.

OTHER PUBLICATIONS

"Mixed-Bandwidth Cross-Channel Speech Recognition via Joint Optimization of DNN-Based Bandwidth Expansion and Acoustic Modeling", Gao et al., Mar. 2019, pp. 559-571. (Year: 2019).*
"Adaptation Algorithms for Neural Network-based speech recognition: An overview", Bell et al., Feb. 2021, pp. 1-32 (Year: 2021).*
Hou et al.; "Multi-task Learning for End-to-end Noise-robust Bandwidth Extension"; Interspeech, Oct. 25-29, 2020, pp. 4069-4073.
Bell, et al., "Adaptation Algorithms for Neural Network-Based Speech Recognition: an Overview", In Repository of arXiv:2008.06580v2, Feb. 28, 2021, 32 Pages.
Gao, et al., "An experimental study on joint modeling of mixed-bandwidth data via deep neural networks for robust speech recognition", In Proceedings of International Joint Conference on Neural Networks, Jul. 24, 2016, pp. 588-594.

(Continued)

*Primary Examiner* — Thierry L Pham
(74) *Attorney, Agent, or Firm* — Foley IP Law, PLLC

(57) ABSTRACT

A method of processing speech includes: providing a first set of audio data having audio features in a first bandwidth; down-sampling the first set of audio data to a second bandwidth lower than the first bandwidth; producing, by a high frequency reconstruction network (HFRN), an estimate of audio features in the first bandwidth for the first set of audio data, based on at least the down-sampled audio data; inputting, into the HFRN, a second set of audio data having audio features in the second bandwidth; producing, by the HFRN, based on a second set of audio data having audio features in the second bandwidth, an estimate of audio features in the first bandwidth for the second set of audio data; and training a speech processing system (SPS) using the estimates of audio features in the first bandwidth for the first and second sets of audio data.

20 Claims, 9 Drawing Sheets

(56) References Cited

OTHER PUBLICATIONS

Gao, et al., "Mixed-Bandwidth Cross-Channel Speech Recognition via Joint Optimization of DNN-Based Bandwidth Expansion and Acoustic Modeling", In Journal of IEEE/ACM Transactions on Audio, Speech, and Language Processing, vol. 27, Issue 3, Dec. 13, 2018, pp. 559-571.

Nidadavolu, et al., "Investigation on Neural Bandwidth Extension of Telephone Speech for Improved Speaker Recognition", In Proceedings of IEEE International Conference on Acoustics, Speech and Signal Processing, May 12, 2019, pp. 6111-6115.

Szoke, et al., "Building and Evaluation of a Real Room Impulse Response Dataset", In Repository of arXiv:1811.06795v1, Nov. 16, 2018, 13 Pages.

"International Search Report and Written Opinion Issued in PCT Application No. PCT/US22/080193", dated Mar. 13, 2023, 15 Pages.

* cited by examiner

FEATURE DOMAIN BANDWIDTH EXTENSION AND SPECTRAL REBALANCE FOR ASR DATA AUGMENTATION

BACKGROUND OF THE DISCLOSURE

1. Field of the Disclosure

The present disclosure relates to a system and a method for speech processing, and relates more particularly to a system and a method for feature domain artificial bandwidth extension (ABE) in speech processing.

2. Description of the Related Art

For training or adapting a speech processing system (SPS), e.g., automatic speech recognition (ASR) or voice biometrics system, a situation arises in which a first set of data collected from a certain processing bandwidth A is sought to be used for training or adapting a speech processing system that is expected to process data using a higher bandwidth B. A processing bandwidth refers to the signal processing that is applied to the acoustic signal captured, e.g., at a microphone. An example of signal processing is band-pass filtering typically applied before transmission or storage, which band-pass filtering is applied to limit the frequency range in which information is present in a signal (e.g., for compression reasons). As an example, it is typical to refer to an 8 kHz sample rate as narrowband and 16 kHz sample rate as wideband, e.g., in the telephony use case. In a typical example, data from a first signal source (e.g., corresponding to processing bandwidth A) may be required for performing data augmentation to further match its acoustic properties to a second signal source (e.g., corresponding to processing bandwidth B), for example by applying a room impulse response. A related issue that needs to be addressed is that of spectral balance (i.e., distribution of the long term energy in frequency spectrum) mismatch between data from signal source having processing bandwidth A and data from signal source having processing bandwidth B.

Current state of the art (SOTA) methods for dealing with the bandwidth mismatch (e.g., using lower-bandwidth-processed data to train and/or adapt higher-bandwidth-processed data) are referred to as artificial bandwidth extension (ABE) methods (algorithms), of which there are several known ones. The current SOTA ABE methods are focused on the telephony use case in which a narrowband signal is to be extended to a wideband signal. In such a case, the optimization criterion is human perception. More generally, all current ABE methods target a perceptual optimization criterion. However, for the speech processing (e.g., ASR) use case, this perceptual criterion may not be optimal. In addition, in the current SOTA, the spectral balance mismatch issue is typically addressed by equalizing the spectral balance to the desired shape, which may not be optimal for the speech processing (e.g., ASR) use case. Moreover, in the current SOTA, the processing systems are operating in a run time mode, meaning that they are typically required to operate with low latency and low computational complexity and do not assume knowledge of the speech content (e.g., text transcription) in the signal.

Therefore, there is a need to provide an improved ABE which is optimal for the speech processing (e.g., ASR) use case.

SUMMARY OF THE DISCLOSURE

According to an example embodiment of a method and a system for ABE, the transcription information typically available with ASR training/adaptation data is utilized to achieve an improved ABE processing, e.g., with an artificial intelligence (AI) model that has an optional ASR-related cost function.

According to an example embodiment of a method and a system for ABE, the AI model is used to apply the ABE processing to low-bandwidth data, and then optionally, augment the ASR training/adaptation data with a range of bandwidths, thereby enabling the ASR model to learn to work with different bandwidth signals.

According to an example embodiment of a method and a system for ABE, a range of equalizations (i.e., a number of equalization filtering operations) can be applied to the long term spectrum and enable the ASR AI model to learn to selectively ignore or be more robust to different spectral balance issues, thereby enabling the ASR AI model to effectively operate in a range of acoustic environments. In this manner, a more generic ASR AI model can be effectively deployed in a range of scenarios involving acoustic changes in the deployed environment.

According to an example embodiment of the method and the system for ABE, the ABE process is implemented with ASR optimization criteria (e.g., minimum word error rate (WER)) and operate in the feature domain used for ASR (rather than in the waveform domain or linear frequency domain). In this manner, the ABE process optimization is attuned to ASR and with potentially less complexity (e.g., when performing the ABE in the log-Mel filter bank domain, the dimension of the problem can be as low as 60 dimensions compared to 256 dimensions for linear frequency domain for each time frame).

According to an example embodiment of the method and the system for ABE, in the use case for augmentation of training/adaptation data, the time-aligned and transcribed text corresponding to the audio is utilized to take advantage of text-to-speech (TTS) technology to assist in the reconstruction of the higher frequency bandwidth regions (i.e., the reconstruction is based on an acoustic component as well as a linguistic component).

According to an example embodiment of the method and the system for ABE, the training/adaption processing is performed offline, e.g., utilizing large scale computing resources, such that there is no requirement for low complexity or delay in processing.

According to an example embodiment of the method and the system for ABE, an AI model is trained to learn to reconstruct the high frequency bandwidth signal components from a lower frequency bandwidth signal using text, acoustic data and/or ASR optimization criteria. The reconstructed high frequency bandwidth data can be low-pass filtered with different cut off frequencies to augment the data and allow the AI model to work in a variety of signal bandwidth environments.

DETAILED DESCRIPTION

Figure 1:
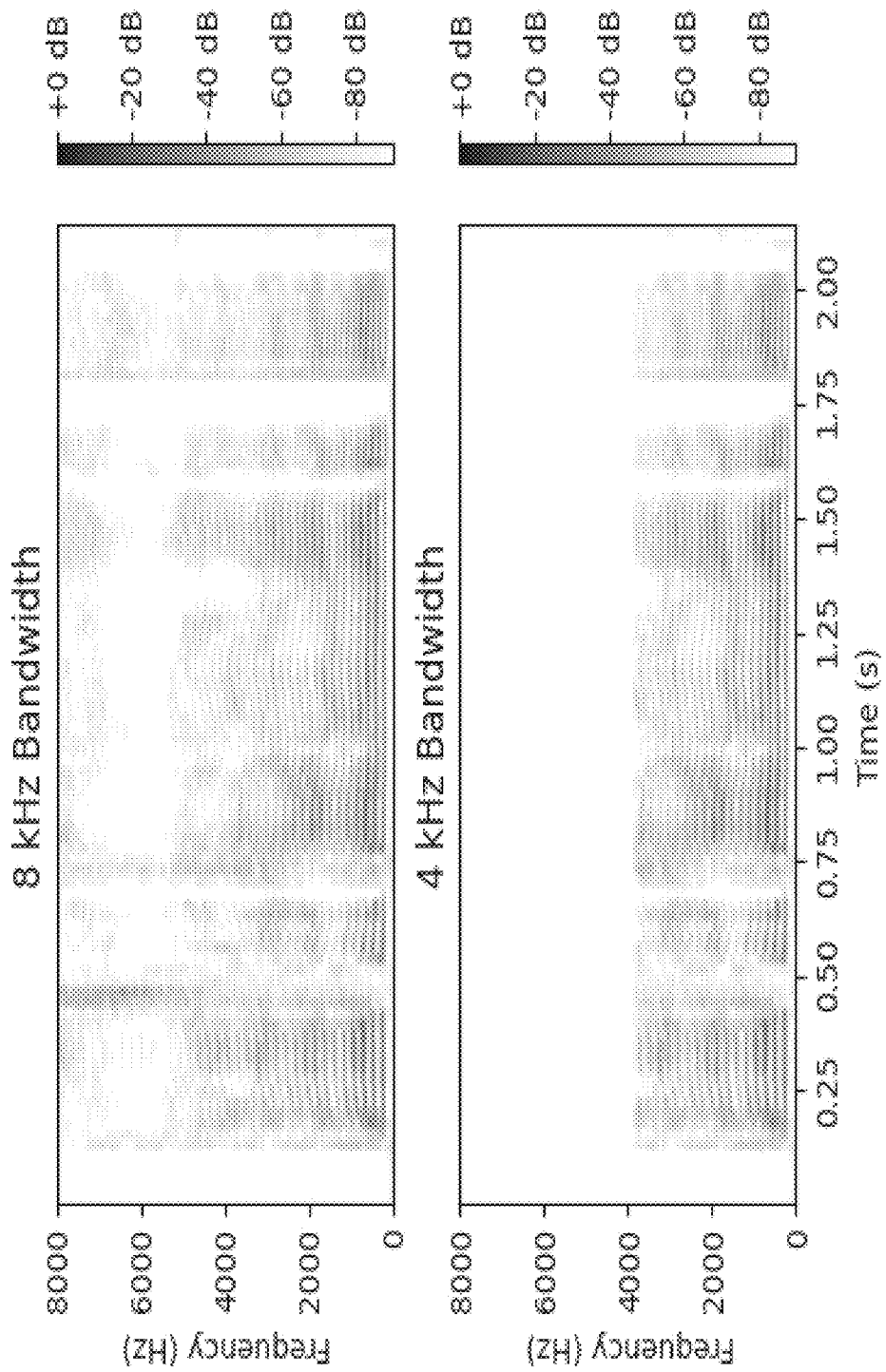
FIG. 1 illustrates two different processing bandwidths for audio signal data.

FIG. 1 illustrates two different processing bandwidths (0-4 kHz, labeled "4 kHz bandwidth", and 0-8 kHz, labeled "8 kHz bandwidth") for audio signal data. For training or adapting a speech processing system, e.g., automatic speech recognition (ASR) or voice biometrics system, a first example scenario involves a first set of data collected from a lower processing bandwidth A (e.g., 0-4 kHz processing bandwidth), also referred to as data domain A, which first set of data is sought to be used for training or adapting a speech processing system that is expected to process data using a higher bandwidth (e.g., within the 0-8 kHz bandwidth), also referred as data domain B. In this example scenario, data domain A is potentially cleaner, i.e., has less reverberation and noise, and has a different spectral tilt (i.e., distribution of long-term energy in frequency domain) than data domain B, but the data domain B is the domain in which the ASR system is expected to operate.

A first example embodiment of a method and a system for using lower-bandwidth-processed data to train and/or adapt higher-bandwidth-processed data (which is referred to as artificial bandwidth extension (ABE)) focuses on creating an ASR model (e.g., ASR AI model) that works well in data domain B using data from data domain A. To achieve this goal, in a first example embodiment of the method and the system for ABE, e.g., a text-to-speech (TTS) type ABE system, the ABE system is trained to learn to map the data from data domain A to data domain B in the feature space (e.g., the log-Mel filter bank (LMFB) spectrum or space) of the ASR model, along with a loss function that includes ASR loss and/or with additional speaker information. In addition, an example embodiment of the method and the system for ABE is trained to learn one or more equalization filter(s) for mapping the spectral tilt of data domain A to the spectral tilt of data domain B. Optionally, additional data augmentation techniques, e.g., room impulse response (RIR), can be applied.

In accordance with the first example embodiment of the method according to the present disclosure, an AI model (e.g., a neural network) is trained to learn to reconstruct a given information of lower bandwidth data (of data domain A) in higher bandwidth domain (data domain B). An example method of training the AI model can include, without limitation, one or more of the following.

1) using a loss function that includes ASR loss and/or reconstruction loss;
2) using a text-to-speech component for reconstruction (i.e., linguistic information);
3) using speaker-related features for reconstruction, i.e., speaker-related meta tags such as gender, age, accent, language, or neural embeddings;
4) using the AI model to map lower bandwidth data to higher bandwidth data to match the respective spectral tilts; and
5) using other acoustic information, e.g., the location of the recording (room type, location within a room, etc.).

In the first example embodiment of the method, which is explained in further detail below, a TTS-based ABE system is trained to learn to map the data from data domain A to data domain B in the feature space (e.g., the log-Mel filter bank space) of the ASR system, with i) a loss function that includes ASR loss, and ii) additional speaker information. Additionally, the TTS-based ABE system is trained to learn an equalization filter for mapping the spectral tilt from domain A to B.

Figure 2A:
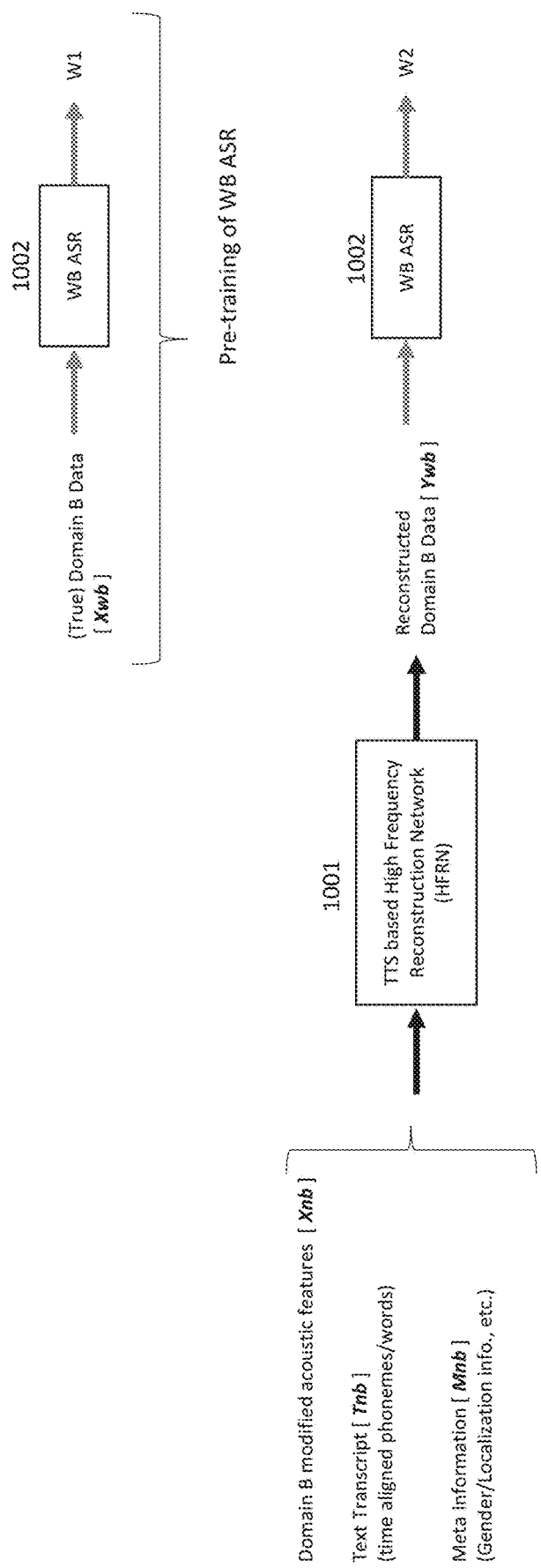
FIG. 2a illustrates an example method of training a TTS-based ABE model.

FIG. 2a illustrates an example method of training a TTS-based ABE model, e.g., a TTS-based High Frequency Reconstruction Network (HFRN) 1001, to learn to reconstruct the feature information in the higher frequencies given lower bandwidth input.

The initial step involves processing (e.g., down sampling) the domain B data to match the lower bandwidth of data domain A. The domain B (i.e., high bandwidth) data are denoted as wb; the down-sampled version of the domain B data are denoted as nb; the ASR features from the true (unmodified) domain B data are denoted as Xwb; and the ASR features from the down-sampled version of the domain B data are denoted as Xnb (e.g., 80-dimensional log-Mel filter bank features). For example, in the case the domain B data are sampled at 16 kHz and the domain A data are sampled at 8 kHz, the domain B data (wb) are down-sampled to 8 kHz (e.g., by low-pass filtering followed by decimation) to produce nb. Then, from each of down-sampled data set B (nb) and data set A, both of which are now at a sample rate of 8 kHz, a selected number of log-Mel filter bank features, e.g., 80, can be extracted. Essentially, what the method is attempting to create is a parallel data set from domain B data that includes the true data set B and an artificially bandwidth-reduced (via down-sampling) version of dataset B that has the lower bandwidth. This resulting parallel data set then allows us to train a neural network system (e.g., ASR AI system or model, which can be embodied at least in part as high frequency reconstruction network (HFRN)) to learn how to re-create the high frequency information. It should be noted that channel-related effects (such as those effecting the long term spectral shape) present in data set A may not be handled, so an additional (and optional) equalization step can be implemented to address these channel-related effects.

In addition to the above, Tnb denotes the text transcription (e.g., time-aligned phonemes and/or words) of down-sampled domain B data, and Mnb denotes one or more meta data embeddings including speaker and/or localization information, e.g., gender of the speaker, a d-Vector (denoting "deep vector") type neural embedding from a speaker recognition/verification system, and other meta data such as the location of the sound source, room type, Long Term Average Speech Spectrum (LTASS)-based equalization transfer functions, etc. The meta data embedding is described in further detail in connection with FIG. 2b.

Figure 2B:
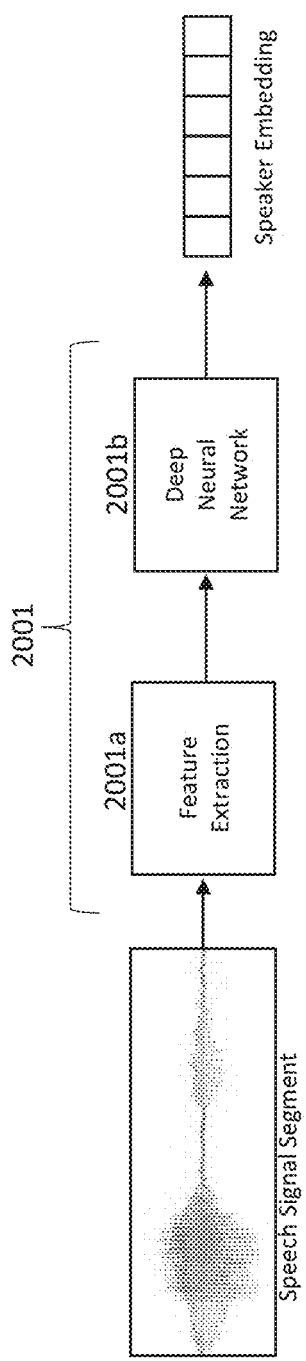
FIG. 2b illustrates the details of an example embodiment of a speaker embedding system.

FIG. 2b illustrates the details of an example embodiment of a speaker embedding system for extracting and learning speaker embedding vectors. The speaker embedding system 2001 shown in FIG. 2b includes a feature extraction module 2001a and a deep neural network 2001b system. The speaker embedding system 2001 extracts, e.g., the above-mentioned d-vector type embedding vectors for a given speech segment. The embedding vectors are vectors that describe the speaker characteristics such that voices that sound similar are close in the embedding space and those that are very different are far apart in the embedding space, whereby the embedding vectors allow a machine-learning system to distinguish among a large pool of voices. These embeddings are compressed representations of the speaker characteristics, which enable the HFRN to better reconstruct the missing high frequency data.

In addition to the above-described speaker embeddings, embeddings for other meta data associated with the speech data, e.g., the location of the sound source, room type, and LTASS-based equalization transfer function(s), can be provided. Alternatively, instead of embeddings for other meta data, a codebook-type vector for the other meta data can be provided. For example, the azimuth of sound sources can be discretized into a 5-bit binary vector that enables mapping the azimuth with a resolution of 360/2' (i.e., 11.25) degrees.

As shown in FIG. 2a, the TTS-based HFRN 1001 is trained to take selected input information (e.g., the acoustic information (Xnb), the text transcript information (Tnb) and the meta information (Mnb)) and produces an estimate of the higher bandwidth features (referred to as "reconstructed domain B data" in FIG. 2a), which is denoted as Ywb. In order to train the reconstruction network, HFRN 1001, an example embodiment can also take into account two loss terms: i) reconstruction loss, which measures the closeness of the reconstructed features (Ywb) to the actual high bandwidth features (Xwb); and ii) ASR loss, which measures the closeness of the ASR outputs from the reconstructed and actual high bandwidth features. The sum of the reconstruction loss (RL) and the ASR loss (AL) represents the total loss, which can be represented as the following expression:

Total Loss=θ·RL+(1−θ)·AL where RL=L{Ywb,Xwb} and AL=L{W1,W2}. RL is the reconstruction loss in the feature space of ASR (e.g., log-Mel filter bank domain) and measures the closeness of the reconstructed features to the actual high bandwidth features. AL is the ASR loss that measures the closeness of the ASR outputs from the reconstructed and the actual high bandwidth features. L { } can be a suitable cost function, e.g., Root Mean Square Error (RMSE), Mean Square Error (MSE) or Mean Absolute Error (MAE). θ allows for controlling 'bias' towards ASR target.

The WB ASR system 1002 shown in the right half of FIG. 2a is an ASR system pre-trained with the original (true) domain B data wb, which input of wb produces output W1, as shown in the upper right half of FIG. 2a. The pre-trained WB ASR system 1002 takes the reconstructed domain B data, Ywb, and produces output W2. The ASR loss for training the HFRN 1001 refers to the distance between the outputs W1 and W2. The reconstruction loss for training the HFRN 1001 is the closeness of Ywb to Xwb.

Figure 2C:
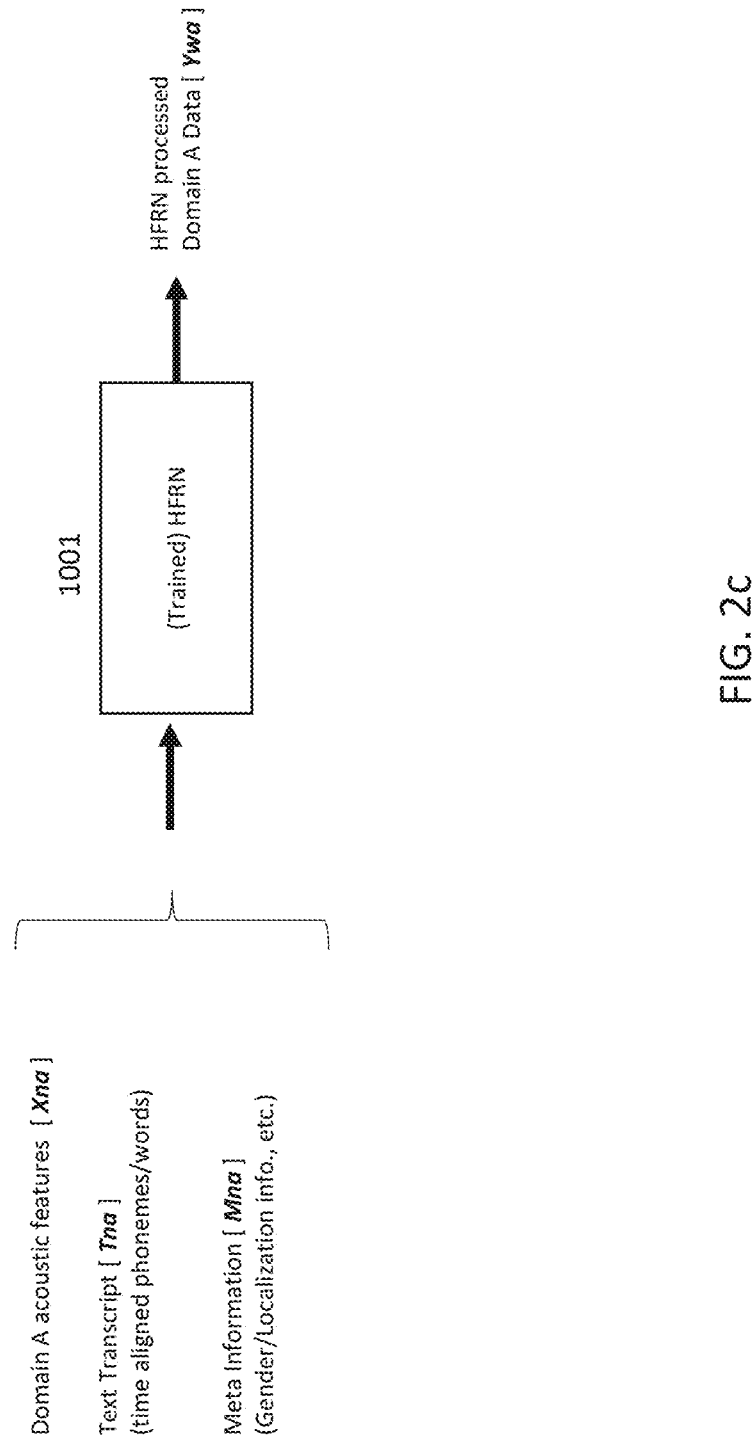
FIG. 2c illustrates generation of training data from lower bandwidth domain A data.
Figure 2D:
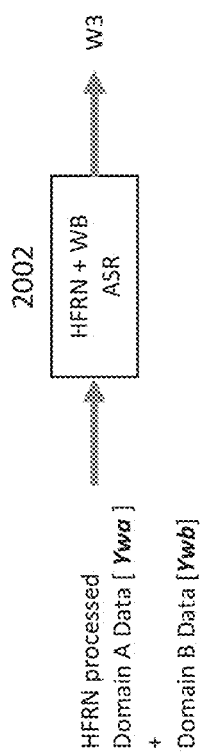
FIG. 2d illustrates HFRN-processed domain A data and the reconstructed domain B data being used to train a new ASR system.

After the HFRN 1001 has been trained as discussed above, the next stage of the example method involves generating training data from domain A data (denoted as Xna), as shown in FIG. 2c. The following inputs are fed to the trained HFRN 1001: domain A acoustic features or information (Xna); Tna, which denotes the text transcription (e.g., time-aligned phonemes and/or words) of domain A data; and Mna, which denotes one or more meta data embeddings including speaker and/or localization information (such as gender, audio environment (e.g., the location of the sound source or room type), Long Term Average Speech Spectrum (LTASS)-based equalization transfer functions, etc.). The trained HFRN 1001 outputs estimates of the high bandwidth features, Ywa, as HFRN-processed domain A data. Next, as shown in FIG. 2d, HFRN-processed domain A data, Ywa, and the reconstructed domain B data, Ywb, are used to train a new ASR system producing output W3, which ASR system is denoted as HFRN+WB ASR 2002.

Figure 3A:
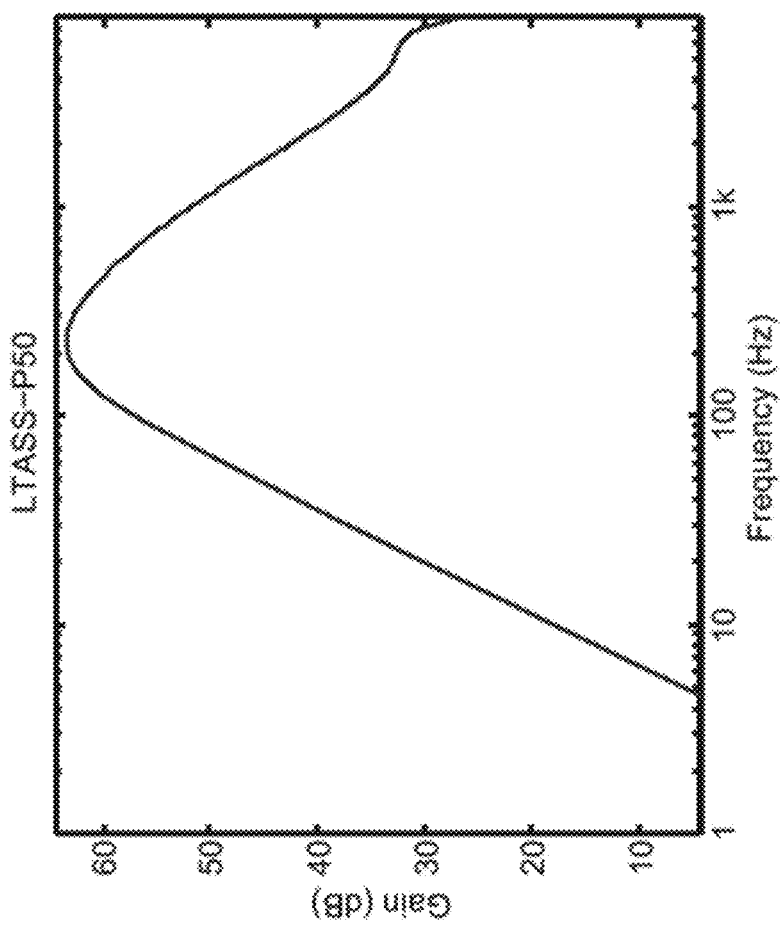
FIG. 3a illustrates the characteristic shape of LTASS.

In addition to the above, an optional process of applying Long Term Average Speech Spectrum (LTASS)-based equalization transfer function can be implemented. The LTASS-based equalization transfer function describes how the spectral tilt in domain A maps to domain B. The LTASS has a characteristic shape, which is shown in FIG. 3a, that is used as a model for the clean speech spectrum, and hence the LTASS is often used in speech processing algorithms. The ITU-T P.50 standard (ITU-T, Artificial Voices, International Telecommunications Union (ITU-T) Recommendation P.50, September 1999) defines the equation for approximating the LTASS shown in FIG. 3a. The Power spectrum of Long term Deviation (PLD) for time frame i and frequency bin k is defined as:

$$PLD(i,k)=\log(P_s(i,k))-\log(P_{LTASS}(k)), \quad (1)$$

where $P_{LTASS}(k)$ is the LTASS power spectrum and $P_S(i, k)$ is the magnitude power spectrum of speech signal. $P_S(i, k)$ is defined as follows:

$$P_s(i,k)=S(i,k) \times S^*(i,k) \quad (2)$$

where S(i, k) is the Discrete Fourier Transform (DTF) of the speech signal and S*(i, k) denotes the complex conjugate of the DFT of the speech signal. The speech signal is split into discrete short time frames by multiplying the time domain signal with a window function (e.g., Hanning window), producing/time frames (e.g., 30 ms frames). The long-term deviation of the magnitude spectrum of the signal (calculated over the entire dataset), $P_{LTLD}$, is defined as follows $$P_{LTLD}(k) = \frac{1}{N_i}\sum_{i=1}^{N_i} PLD(i, k) \quad (3)$$

where k is the frequency index, PLD is the power spectrum of long-term deviation as defined in (1).

Figure 3B:
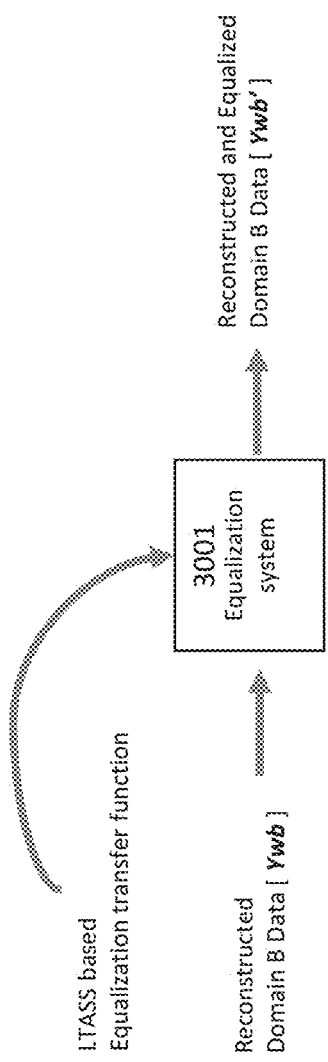
FIG. 3b shows an example embodiment in which the LTASS-based equalization transfer function is applied.
Figure 3C:
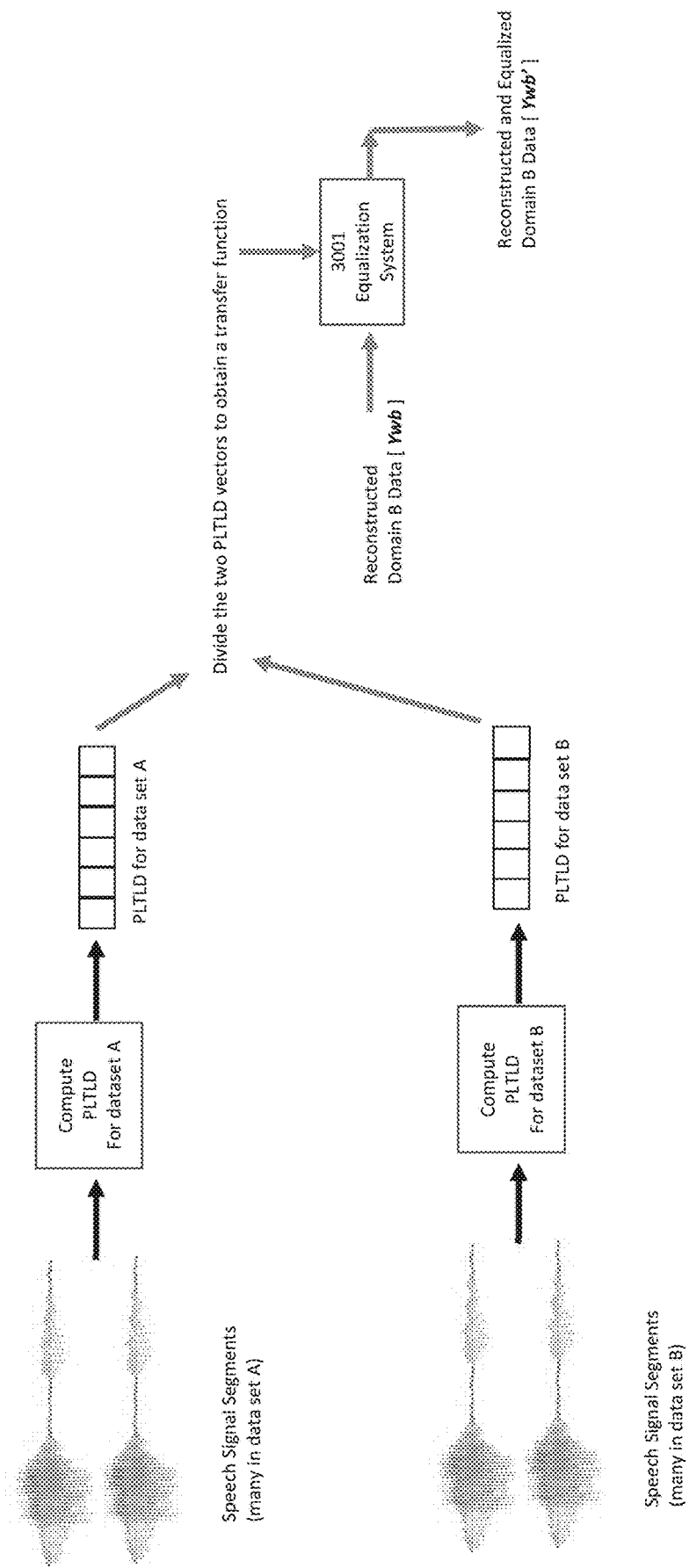
FIG. 3c shows an example process for obtaining the PLTLDs for domain A and domain B data sets.

FIG. 3b shows an example embodiment in which the LTASS-based equalization transfer function is applied. In this example embodiment, the difference between LTASS and the speech signal in domain A data set is computed, e.g., by averaging the spectra of speech from domain A data set and computing the distance from a typical LTASS curve. In other words, the difference between the signal of interest and LTASS in the log magnitude spectral domain is computed and average over the entire domain A data set. This results in the deviation of the long term spectrum in the domain A data set from LTASS (i.e., PLTLD discussed above). The difference between LTASS and the speech signal in domain B data set is computed in a similar manner. This process for obtaining the PLTLDs is illustrated in detail in FIG. 3c. Next, the two differences (i.e., PLTLDs) are divided to obtain a transfer function in the frequency domain (in the log-Mel filter bank ASR feature space, this would be a difference) that maps the spectral tilt from domain A to domain B. The resulting transfer function provides an additional meta data vector term that describes the equalization that needs to be applied to the input to ensure that the spectral tilt matches the spectral tilt in domain B. Each transfer function can be, e.g., a vector of 128×1 in dimension (if 32 ms frames at 8 kHz sample rate are assumed, 0.032*8000=256 samples would be provided, which, after applying a real Discrete Fourier Transform (DFT) or Fast Fourier Transform (FFT), result in a frequency spectrum with 128 complex coefficients, from which we can further obtain the power spectrum. Thus, the equalization system 3001 shown in FIG. 3b takes as inputs LTASS-based equalization transfer function (which is more precisely PLTLD-based transfer function, so this term is used interchangeably with LTASS-based equalization transfer function) and the feature inputs (i.e., reconstructed domain B data Ywb), and outputs the equalized features, reconstructed and equalized domain B data Ywb' (e.g., log-Mel filter bank features). It should be noted that this application of LTASS-based equalization transfer function is independent of the actual phoneme/word and is applied in a separate processing step.

In a second example scenario for training or adapting a speech processing system, e.g., automatic speech recognition (ASR) or voice biometrics system, a first set of data collected from 0-4 kHz processing bandwidth (also referred to as data domain A) and a second set of data collected from a higher bandwidth, e.g., within the 0-8 kHz bandwidth (also referred as data domain B), are present, and the goal of a second example embodiment of a method and a system for ABE is to create an ASR model that works well in both data domain A and data domain B. To achieve this goal, in the second example embodiment of the method and the system for ABE, e.g., a text-to-speech (TTS) type ABE system, the ABE system is trained in a manner substantially identical to the manner described in connection with the first example embodiment of the method and the system for ABE, with the addition of multi-condition training (MCT).

Figure 4:
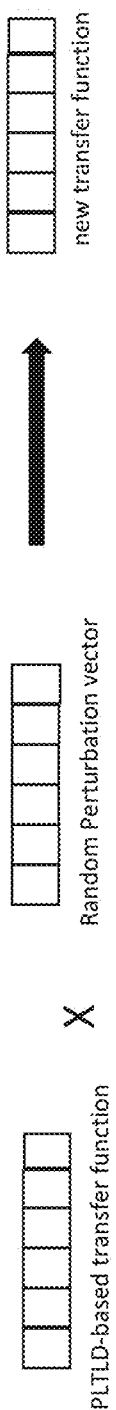
FIG. 4 illustrates the equalization transfer function being multiplied with a random perturbation vector to produce a new equalization transfer function.

The above-described details of the first example embodiment apply to the second example embodiment, with the addition of multi-condition training (MCT) when training the ASR system. An example embodiment of the MCT involves two steps. As a first step, when computing the equalization transfer function from data domain A to data domain B, the equalization transfer function (e.g., PLTLD-based equalization transfer function, which is also referred to as LTASS-based equalization transfer function) is randomly perturbed (using random perturbation vectors) so that there are several equalizations learned (i.e., to account for a range of different spectral tilts). As shown in FIG. 4, the equalization transfer function is multiplied with a random perturbation vector to produce a new equalization transfer function, and this is repeated for different random perturbation vectors. As a second step, a number of HFRNs are trained with different cut-off frequencies to allow the ASR system to learn multiple different bandwidths. For example, 4 different HFRNs can be trained:

i) one where the domain B data (e.g., 16 kHz bandwidth) is down-sampled to 10 kHz and a corresponding HFRN trained;
ii) another one where the domain B data is down-sampled to 8 kHz and a corresponding HFRN trained;
iii) another one where the domain B data is down-sampled to 7 kHz and a corresponding HFRN trained; and
iv) another one where the domain B data is down-sampled to 6 kHz and a corresponding HFRN trained.

Then, the data from domain A are processed with a mix of the above 4 HFRNs to produce HFRN-processed domain A data (e.g., as shown in FIG. 2c for the first example embodiment). Thereafter, the step corresponding to the step shown in FIG. 2d for the first example embodiment is performed.

As a summary, several examples of the method and the system according to the present disclosure are provided.

A first example of the method according to the present disclosure provides a method of processing speech, comprising:

providing a first set of audio data having audio features in a first bandwidth; down-sampling the first set of audio data to a second bandwidth lower than the first bandwidth;

producing, by a high frequency reconstruction network (HFRN), an estimate of audio features in the first bandwidth for the first set of audio data, based on at least the down-sampled audio data of the second bandwidth;

inputting, into the HFRN, a second set of audio data having audio features in the second bandwidth;

producing, by the HFRN, an estimate of audio features in the first bandwidth for the second set of audio data, based on the second set of audio data having audio features in the second bandwidth; and training a speech processing system (SPS) using i) the estimate of audio features in the first bandwidth for the first set of audio data, and ii) the estimate of audio features in the first bandwidth for the second set of audio data.

In a second example of the method modifying the first example of the method, the estimate of audio features in the first bandwidth for the first set of audio data is produced additionally based on at least one of i) text transcription of the first set of audio data, and ii) meta data embedding for the first set of audio data.

In a third example of the method modifying the second example of the method, the meta data embedding for the first set of audio data includes meta data characterizing at least one of a speaker, audio environment, and Long Term Average Speech Spectrum (LTASS)-based equalization transfer function.

In a fourth example of the method modifying the second example of the method, the estimate of audio features in the first bandwidth for the second set of audio data is produced additionally based on at least one of i) text transcription of the second set of audio data, and ii) meta data embedding for the second set of audio data.

In a fifth example of the method modifying the fourth example of the method, the meta data embedding for the second set of audio data includes meta data characterizing at least one of a speaker, audio environment, and Long Term Average Speech Spectrum (LTASS)-based equalization transfer function.

In a sixth example of the method modifying the fourth example of the method, the SPS is an automatic speech recognition (ASR) system, and the sixth example of the method further comprises initially training the ASR system with the first set of audio data having audio features in the first bandwidth.

A seventh example of the method modifying the sixth example of the method, the seventh example of the method further comprising:

training the HFRN to take into account at least one of ASR loss and reconstruction loss;

wherein the ASR loss refers to a variance between an output produced by the ASR using selected data in the first set of audio data having audio features in the first bandwidth and an output produced by the ASR using the estimate of audio features in the first bandwidth for the selected data in the first set of audio data; and wherein the reconstruction loss refers to a variance between audio features of the selected data and the estimate of audio features for the selected data.

In an eighth example of the method modifying the fifth example of the method, the LTASS-based equalization transfer function is applied to produce the estimate of audio features in the first bandwidth for the second set of audio data, and the LTASS-based equalization transfer function maps a spectral tilt of the first set of data in the first bandwidth to a spectral tilt of the second set of data in the second bandwidth.

A ninth example of the method modifying the eighth example of the method, the ninth example of the method further comprising multiplying the LTASS-based equalization transfer function with at least one perturbation vector to produce at least one new equalization transfer function.

A tenth example of the method modifying the seventh example of the method, the tenth example of the method further comprising training a plurality of HFRNs with different cut-off frequencies to enable the ASR system to process audio data in multiple bandwidths.

A first example of the system according to the present disclosure provides a system for performing speech processing, wherein a first set of audio data having audio features in a first bandwidth is provided, and wherein the first set of audio data is down-sampled to a second bandwidth lower than the first bandwidth, the system comprising:
 a high frequency reconstruction network (HFRN) configured to:
  provide an estimate of audio features in the first bandwidth for the first set of audio data, based on at least the down-sampled audio data of the second bandwidth;
  receive a second set of audio data having audio features in the second bandwidth; and
  produce an estimate of audio features in the first bandwidth for the second set of audio data, based on the second set of audio data having audio features in the second bandwidth; and
 a speech processing system (SPS) trained using i) the estimate of audio features in the first bandwidth for the first set of audio data, and ii) the estimate of audio features in the first bandwidth for the second set of audio data.

In a second example of the system modifying the first example of the system, the estimate of audio features in the first bandwidth for the first set of audio data is produced additionally based on at least one of i) text transcription of the first set of audio data, and ii) meta data embedding for the first set of audio data.

In a third example of the system modifying the second example of the system, the meta data embedding for the first set of audio data includes meta data characterizing at least one of a speaker, audio environment, and Long Term Average Speech Spectrum (LTASS)-based equalization transfer function.

In a fourth example of the system modifying the second example of the system, the estimate of audio features in the first bandwidth for the second set of audio data is produced additionally based on at least one of i) text transcription of the second set of audio data, and ii) meta data embedding for the second set of audio data.

In a fifth example of the system modifying the fourth example of the system, the meta data embedding for the second set of audio data includes meta data characterizing at least one of a speaker, audio environment, and Long Term Average Speech Spectrum (LTASS)-based equalization transfer function.

In a sixth example of the system modifying the fourth example of the system, the SPS is an automatic speech recognition (ASR) system, and the ASR system is initially trained with the first set of audio data having audio features in the first bandwidth.

In a seventh example of the system modifying the sixth example of the system, the HFRN is trained to take into account at least one of ASR loss and reconstruction loss; the ASR loss refers to a variance between an output produced by the ASR using selected data in the first set of audio data having audio features in the first bandwidth and an output produced by the ASR using the estimate of audio features in the first bandwidth for the selected data in the first set of audio data; and the reconstruction loss refers to a variance between audio features of the selected data and the estimate of audio features for the selected data.

In an eighth example of the system modifying the fifth example of the system, the LTASS-based equalization transfer function is applied to produce the estimate of audio features in the first bandwidth for the second set of audio data, and wherein the LTASS-based equalization transfer function maps a spectral tilt of the first set of data in the first bandwidth to a spectral tilt of the second set of data in the second bandwidth.

In a ninth example of the system modifying the eighth example of the system, the LTASS-based equalization transfer function is multiplied with at least one perturbation vector to produce at least one new equalization transfer function.

In a tenth example of the system modifying the seventh example of the system, a plurality of HFRNs is trained with different cut-off frequencies to enable the ASR system to process audio data in multiple bandwidths.

ACRONYMS

ABE: Artificial Bandwidth Extension
ASR: Automatic Speech Recognition
HFRN: High Frequency Reconstruction Network
LTASS: Long Term Average Speech Spectrum
TTS: Text to Speech
RMSE: Root Mean Square Error
MCT: Multi Condition Training
MSE: Mean Square Error
MAE: Mean Absolute Error
WER: Word Error Rate

What is claimed is:
1. A method of processing speech, comprising:
 providing a first set of audio data having audio features in a first bandwidth;
 down-sampling the first set of audio data to a second bandwidth lower than the first bandwidth;
 producing, by a high frequency reconstruction network (HFRN), an estimate of audio features in the first bandwidth for the first set of audio data, based on at least the down-sampled audio data of the second bandwidth;
 inputting, into the HFRN, a second set of audio data having audio features in the second bandwidth;
 obtaining an equalization transfer function that maps a spectral tilt of the first set of audio data in the first bandwidth to a spectral tilt of the second set of audio data in the second bandwidth, wherein the equalization transfer function is multiplied by a random perturbation vector;
 producing, by the HFRN, an estimate of audio features in the first bandwidth for the second set of audio data, based on the second set of audio data having audio features in the second bandwidth;
 applying the equalization transfer function to the estimate of audio features in the first bandwidth for the second set of audio data; and training a speech processing system (SPS) using i) the estimate of audio features in the first bandwidth for the first set of audio data, and ii) the estimate of audio features in the first bandwidth for the second set of audio data.

2. The method of claim 1, wherein:
the estimate of audio features in the first bandwidth for the first set of audio data is produced additionally based on at least one of i) text transcription of the first set of audio data, and ii) meta data embedding for the first set of audio data.

3. The method of claim 2, wherein:
the meta data embedding for the first set of audio data includes meta data characterizing at least one of a speaker, audio environment, and Long Term Average Speech Spectrum (LTASS)-based equalization transfer function.

4. The method of claim 2, wherein:
the estimate of audio features in the first bandwidth for the second set of audio data is produced additionally based on at least one of i) text transcription of the second set of audio data, and ii) meta data embedding for the second set of audio data.

5. The method of claim 4, wherein:
the meta data embedding for the second set of audio data includes meta data characterizing at least one of a speaker, audio environment, and Long Term Average Speech Spectrum (LTASS)-based equalization transfer function.

6. The method of claim 4, wherein the SPS is an automatic speech recognition (ASR) system, the method further comprising:
initially training the ASR system with the first set of audio data having audio features in the first bandwidth.

7. The method of claim 6, further comprising:
training the HFRN to take into account at least one of ASR loss and reconstruction loss;
wherein the ASR loss refers to a variance between an output produced by the ASR using selected data in the first set of audio data having audio features in the first bandwidth and an output produced by the ASR using the estimate of audio features in the first bandwidth for the selected data in the first set of audio data; and
wherein the reconstruction loss refers to a variance between audio features of the selected data and the estimate of audio features for the selected data.

8. The method of claim 5, wherein the equalization transfer function is the LTASS-based equalization transfer function.

9. The method of claim 8, further comprising:
multiplying the LTASS-based equalization transfer function with at least one perturbation vector to produce at least one new equalization transfer function.

10. The method of claim 7, further comprising:
training a plurality of HFRNs with different cut-off frequencies to enable the ASR system to process audio data in multiple bandwidths.

11. A system for performing speech processing, wherein a first set of audio data having audio features in a first bandwidth is provided, and wherein the first set of audio data is down-sampled to a second bandwidth lower than the first bandwidth, the system comprising:
a high frequency reconstruction network (HFRN) configured to:

a) provide an estimate of audio features in the first bandwidth for the first set of audio data, based on at least the down-sampled audio data of the second bandwidth;
b) receive a second set of audio data having audio features in the second bandwidth; and
c) produce an estimate of audio features in the first bandwidth for the second set of audio data, based on the second set of audio data having audio features in the second bandwidth, wherein an equalization transfer function mapping a spectral tilt of the first set of audio data in the first bandwidth to a spectral tilt of the second set of audio data in the second bandwidth is obtained and multiplied by a random perturbation vector, and wherein the equalization transfer function is applied to the estimate of audio features in the first bandwidth for the second set of audio data; and
a speech processing system (SPS) trained using i) the estimate of audio features in the first bandwidth for the first set of audio data, and ii) the estimate of audio features in the first bandwidth for the second set of audio data.

12. The system of claim 11, wherein:
the estimate of audio features in the first bandwidth for the first set of audio data is produced additionally based on at least one of i) text transcription of the first set of audio data, and ii) meta data embedding for the first set of audio data.

13. The system of claim 12, wherein:
the meta data embedding for the first set of audio data includes meta data characterizing at least one of a speaker, audio environment, and Long Term Average Speech Spectrum (LTASS)-based equalization transfer function.

14. The system of claim 12, wherein:
the estimate of audio features in the first bandwidth for the second set of audio data is produced additionally based on at least one of i) text transcription of the second set of audio data, and ii) meta data embedding for the second set of audio data.

15. The system of claim 14, wherein:
the meta data embedding for the second set of audio data includes meta data characterizing at least one of a speaker, audio environment, and Long Term Average Speech Spectrum (LTASS)-based equalization transfer function.

16. The system of claim 14, wherein the SPS is an automatic speech recognition (ASR) system, and wherein the ASR system is initially trained with the first set of audio data having audio features in the first bandwidth.

17. The system of claim 16, wherein:
the HFRN is trained to take into account at least one of ASR loss and reconstruction loss;
the ASR loss refers to a variance between an output produced by the ASR using selected data in the first set of audio data having audio features in the first bandwidth and an output produced by the ASR using the estimate of audio features in the first bandwidth for the selected data in the first set of audio data; and
the reconstruction loss refers to a variance between audio features of the selected data and the estimate of audio features for the selected data.

18. The system of claim 15, wherein the equalization transfer function is the LTASS-based equalization transfer function.

19. The system of claim 18, wherein:
the LTASS-based equalization transfer function is multiplied with at least one perturbation vector to produce at least one new equalization transfer function.
20. The system of claim 17, wherein:
a plurality of HFRNs is trained with different cut-off frequencies to enable the ASR system to process audio data in multiple bandwidths.

* * * * *